US005095380A

United States Patent [19]

Kawai

[11] Patent Number: 5,095,380

[45] Date of Patent: Mar. 10, 1992

[54] PHOTOELECTRONIC INTERCONNECTION NETWORK FOR HIGH-SPEED INFORMATION PROCESSING

[75] Inventor: Shigeru Kawai, Tokyo, Japan

[73] Assignee: NEC Corporation, Tokyo, Japan

[21] Appl. No.: 656,321

[22] Filed: Feb. 19, 1991

[30] Foreign Application Priority Data

Feb. 16, 1990 [JP] Japan .................................... 2-35767
Feb. 27, 1990 [JP] Japan .................................... 2-46319

[51] Int. Cl.[5] .......................... G06G 9/00; G02F 1/29

[52] U.S. Cl. .................................... 359/107; 364/525

[58] Field of Search ............... 359/107, 109, 559, 554; 364/525, 514

[56] References Cited

U.S. PATENT DOCUMENTS 4,917,456 4/1990 Johns et al. ......................... 359/107
4,931,959 6/1990 Brenner et al. ..................... 364/525

OTHER PUBLICATIONS

A. A. Sawchuck et al., "Geometries for Optical Implementations of the Perfect Shuffle", SPIE, vol. 963, Optical Computing 88, 1988, pp. 270-282.

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a photoelectronic interconnection device, N×N light emitting elements are arranged on a light emitting plane in a matrix pattern and N×N light sensing elements are arranged on a light receiving plane in a matrix pattern corresponding to the light emitting elements. A lens array of p×p optical lenses is provided, the lenses being disposed on a common optical plane located so that it is spaced from the light receiving plane at a distance q times greater than its distance to the light emitting plane, where N=pq, the lenses being spaced apart from each other at pitch (pq+1)a/(q+1), and a is a pitch between successive light emitting elements. According to other embodiments, the optical plane and the light receiving plane can be spaced apart a distance which is N/2 times greater than the distance between the light emitting plane and the optical plane, and those of the lenses located along two rows and two columns which intersect at the center of the lens array are spaced at pitch (N+6)a/(N+2), and other lenses are spaced part with a pitch 2a. Those of the lenses located along such two rows and two columns can also be spaced at pitch (3N−2)a/(N+2), and the other lenses are spaced at pitch 2(N−2)a/(N+2).

10 Claims, 9 Drawing Sheets

PHOTOELECTRONIC INTERCONNECTION NETWORK FOR HIGH-SPEED INFORMATION PROCESSING

BACKGROUND OF THE INVENTION

The present invention relates generally to interconnection networks for switching signals, and more specifically to an optical interconnection network for high speed information processing.

In high performance computers, an interconnection network is employed for switching signals between multiple processors. The Banyan self-routing network and the crossover network are known in the art. However, the technique used in these networks are electronic, and hence it involves the use of a large amount of copper wire connections. Currently, the electronic interconnection approach has almost reached its technological bounds. In order to overcome this problem, optical approach has been contemplated, and a number of proposals have so far been made for taking advantage of optical properties of lightwaves. A most recent proposal is one described in "Geometries for Optical Implementations of the Perfect Shuffle", A. A. Sawchuk et al, SPIE Vol. 963, Optical Computing 88, pages 270-282. However, interconnection devices which can be universally used for a variety of high speed data processing applications are still desired.

SUMMARY OF THE INVENTION

It is therefore an object of the present invention to provide a practical photoelectronic interconnection device which can be universally used for high performance computers.

It is another object of the present invention to provide a photoelectronic interconnection network which reduces the burden of a controller that provides switching control of the network.

According to a first aspect of the present invention, there is provided a photoelectronic interconnection device comprising a first array of N×N light emitting elements arranged on a light emitting plane in a matrix pattern for emitting light from each of the elements in response to a signal applied thereto. A second array of N×N light sensing elements is provided, the sensing elements being arranged on a light receiving plane in a matrix pattern corresponding to those on the first array. A lens array of p×p optical lenses is provided, the lenses being disposed on a common optical plane which is located between the first and second arrays so that the optical plane and the light receiving plane are spaced apart a distance which is q times greater than a distance between the light emitting plane and the optical plane, where N=pq, the lenses being spaced apart from each other with a pitch (pq+1)a/(q+1), where a is a pitch between the light emitting elements.

In other aspects of the present invention, the optical plane and the light receiving plane are spaced apart a distance which is N/2 times greater than a distance between the light emitting plane and the optical plane, and those of the lenses located along two rows and two columns which intersect at the center of the lens array are spaced apart from each other with a pitch (N+6)a/(N+2), and other lenses are spaced apart from each other with a pitch 2a. Those of the lenses located along two rows and two columns which intersect at the center of the lens array can be spaced apart from each other with a pitch (3N−2)a/(N+2), and other lenses are spaced apart from each other with a pitch 2(N−2)a/(N+2).

According to a further aspect, there is provided a photoelectronic multistage interconnection network. This network comprises a first stage comprising a first array of N×N light emitting elements arranged on a light emitting plane in a matrix pattern for emitting light from each of the elements in response to a signal applied thereto, a second array of N×N light sensing elements arranged on a light receiving plane in a matrix pattern corresponding to the light emitting elements, and a lens array of (N/2)×(N/2) lenses disposed on a common optical plane located between the first and second arrays, the optical plane and the light receiving plane being spaced apart a distance which is N/2 times greater than a distance between the light emitting plane and the optical plane. The network has a second stage which comprises a first array of N×N light emitting elements arranged on a light emitting plane in a matrix pattern for emitting light from each of the elements in response to a signal applied thereto, a second array of N×N light sensing elements arranged on a light receiving plane in a matrix pattern corresponding to the light emitting elements, and four lens arrays of (N/4)×(N/4) lenses each, the lens arrays being disposed on a common optical plane located between the first and second arrays of the second stage, the optical plane and the light receiving plane being spaced apart a distance which is N/4 times greater than a distance between the light emitting plane and the optical plane. A first switch array is provided, including (N/2)×(N/2) three-dimensional 4×4 crossbar switches connected respectively between the light sensing elements of the first stage and the light emitting elements of the second stage. Further provided is a second switch array including (N/2)×(N/2) three-dimensional 4×4 crossbar switches connected respectively to the light sensing elements of the second stage.

BRIEF DESCRIPTION OF THE DRAWINGS

The present invention will be described in further detail with reference to the accompanying drawings, in which.

DETAILED DESCRIPTION

Referring now to FIG. 1, there is shown a three-stage perfect shuffle photoelectronic interconnection network according to the present invention. Each stage of the interconnection network identically comprises a two-dimensional light source array 10, a two-dimensional lens array 11 and a two-dimensional light sensor array 12, which are spaced apart in a face-to-face parallel relationship at predetermined distances as will be described.

Figure 1A:
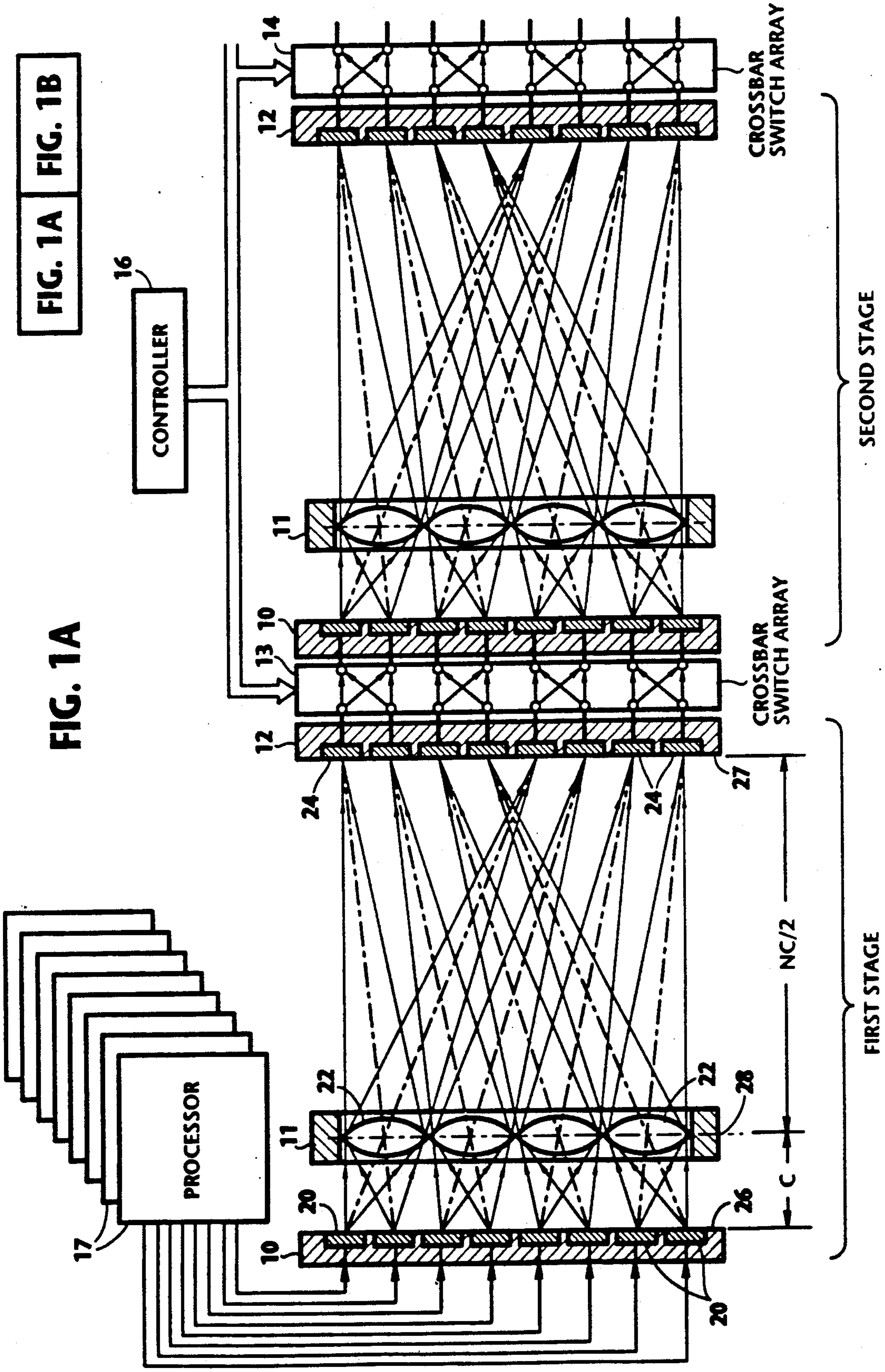
FIGS. 1A and 1B show a longitudinal cross-sectional view of a three-stage photoelectronic interconnection network for a parallel processing system using a perfect shuffle network configuration.
Figure 2:
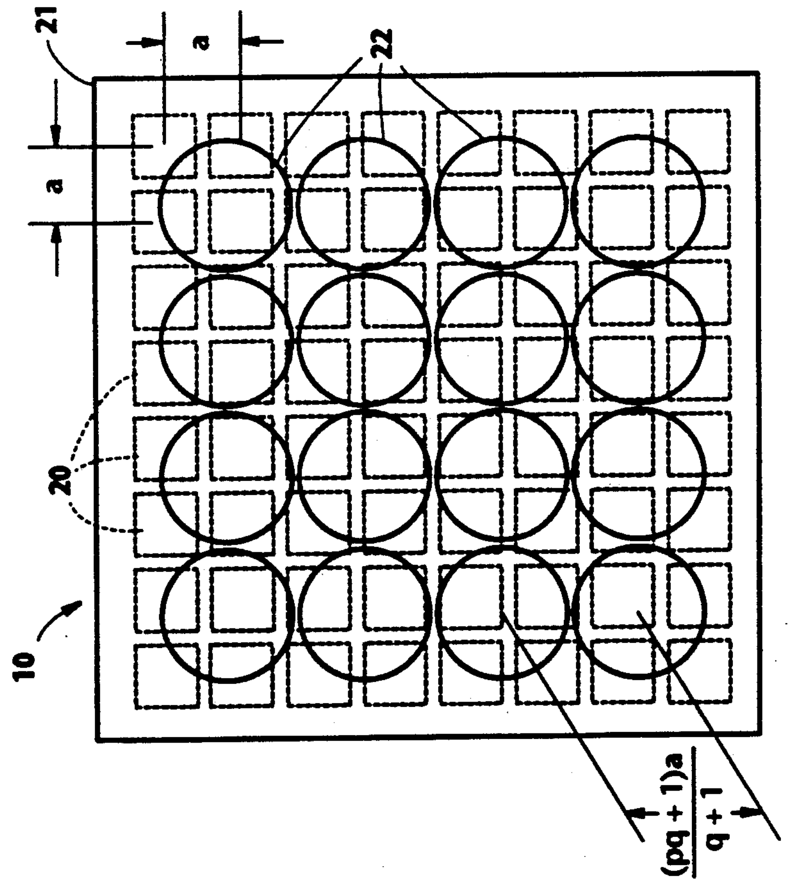
FIG. 2 shows positional relationships between the lenses and LEDs of FIGS. 1A and 1B.

As clearly shown in FIG. 2, light source array 10 comprises sixty-four light emitting cells 20 such as light-emitting diodes or semiconductor lasers which are disposed in an eight-by-eight square matrix pattern on a substrate 21 to define a light emitting plane 26 (FIG. 1A) and arranged with a pitch a in both horizontal and vertical directions. Lens array 11 comprises sixteen double convex converging lenses 22 arranged in a four-by-four square matrix pattern on a lens support 23, with a pitch which is 1.8 times greater than the pitch a of LEDs 20.

Light sensor array 12 is formed by sixty-four photodiodes 24 which are disposed on a substrate 25 in an eight-by-eight square matrix pattern and arranged in a manner identical to the matrix pattern of LEDs 21 to define a light receiving plane 27 which is located at a distance b from light emitting plane 26.

Figure 1B:
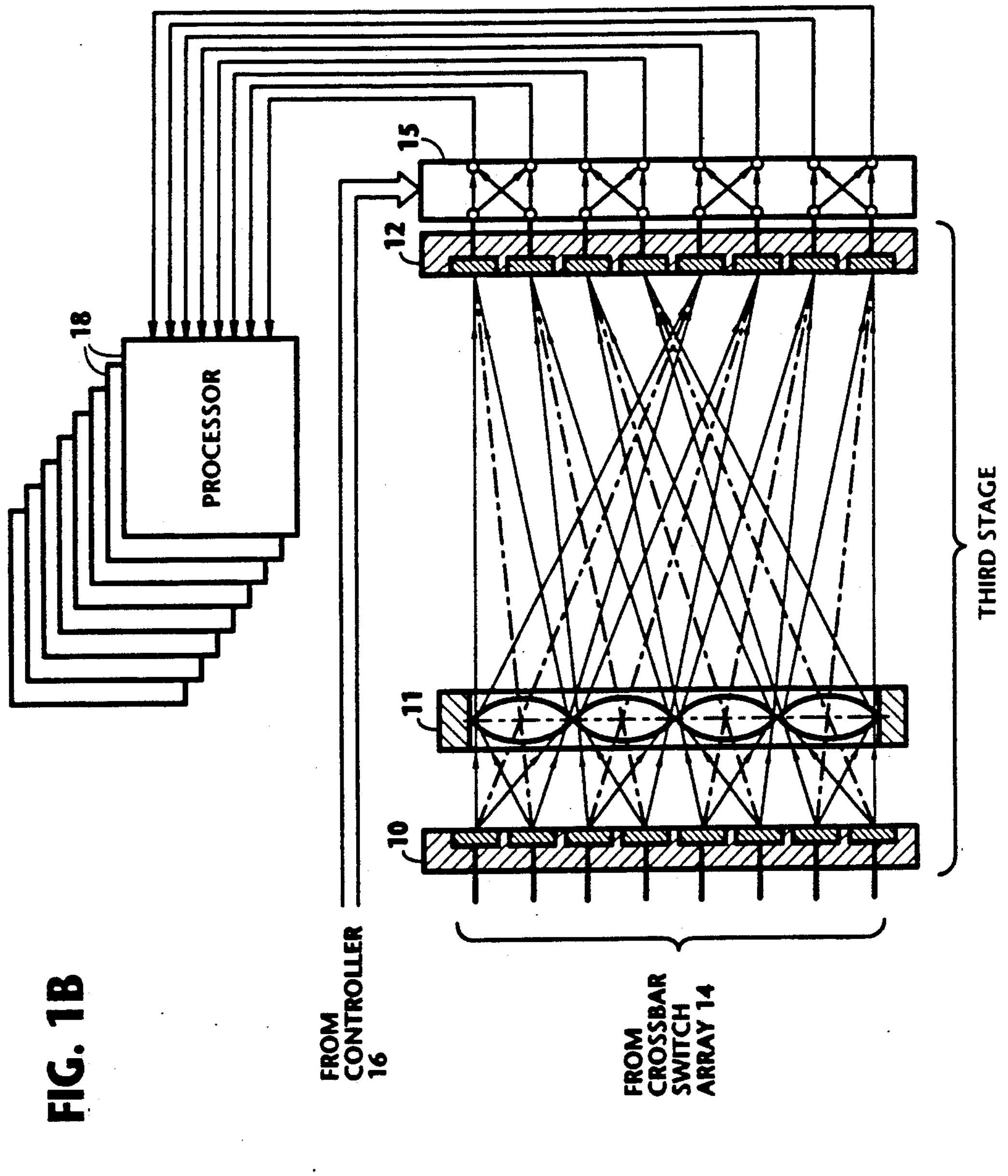

As seen in FIG. 1A, double convex lenses 22 have their center points aligned on a lens plane 28 which is spaced from the light emitting plane 26 at 1/5 of distance b and spaced from plane 27 at 4/5 of distance b. In other words, the focal length of each lens is (4/5)b.

In general terms, N represents the number of LEDs 20 arranged on each side of array 10 and is factored into two positive integers as $N=pq$ so that one-dimensional N-element light-source array is partitioned into p groups of size q. In the illustrated embodiment, $N=8$, $p=2$ and $q=4$. The pitch at which lenses 22 are spaced apart is given by $(pq+1)a/(q+1)$ and the distance between planes 26 and 28 is $b/(q+1)$ and the distance between planes 27 and 28, or focal length is given by $(q.b)/(q+1)$. Alternatively, the focal length can be made to be equal to NC/2, where N is the number of LED's of one dimensional array and C is the distance between planes 26 and 28.

Figure 5:
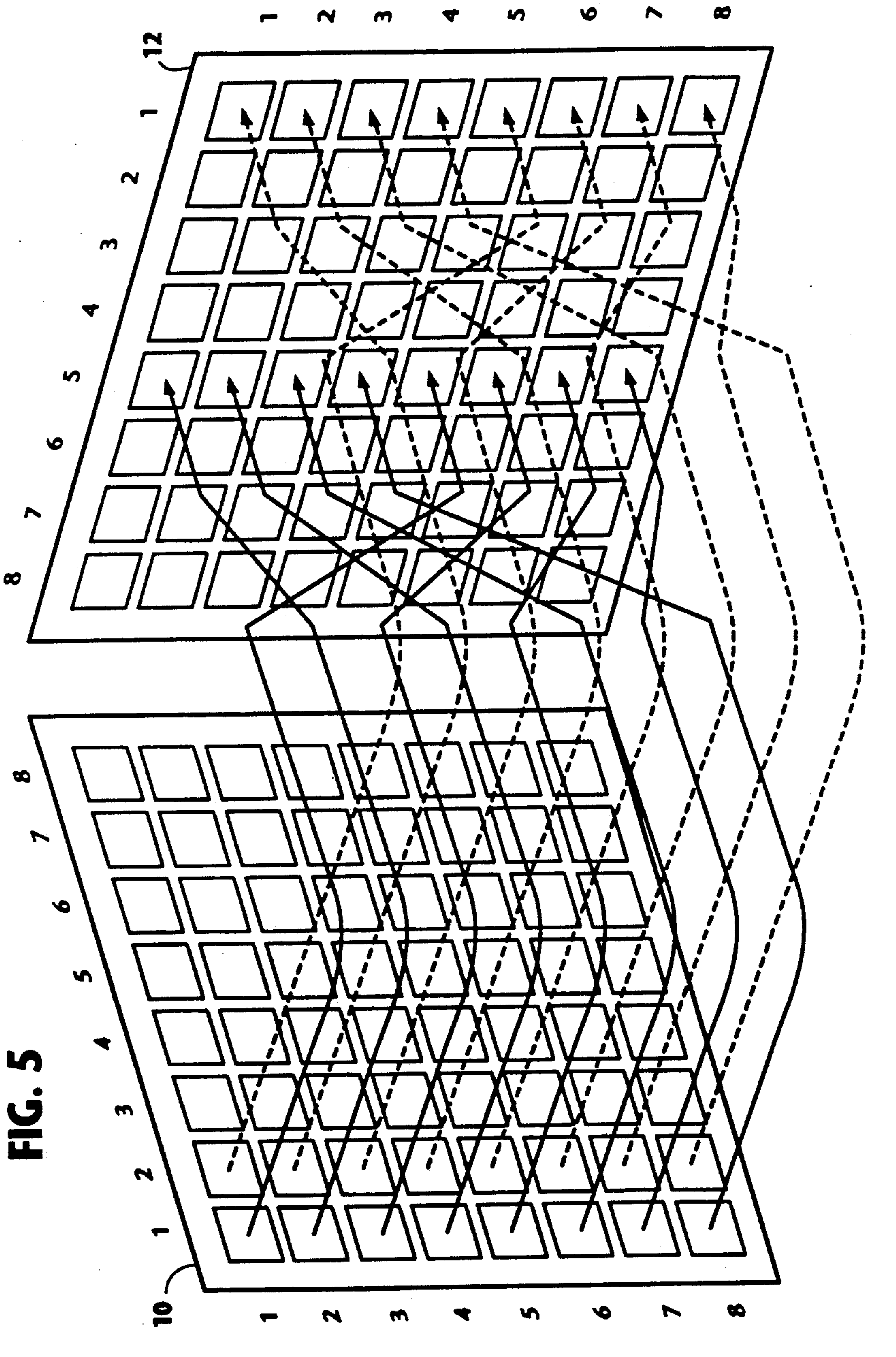
FIG. 5 shows in perspective form the paths of rays emitted from LEDs on the first and second column of the light sensor array of FIGS. 1A and 1B.

As shown in FIG. 5, rays emitted from odd-numbered LEDs #1, #3, #5 and #7 of the first column of the light source array 10 fall on photodiodes #5, #6, #7 and #8, respectively, of the fifth column of the light sensor array 12, and rays from even-numbered LEDs #2, #4, #6 and #8 fall on photodiodes #1, #2, #3 and #4, respectively, of the fifth column. In like manner, rays emitted from odd-numbered LEDs #1, #3, #5 and #7 of the second column of the light source array 10 fall on photodiodes #5, #6, #7 and #8, respectively, of the first column of the light sensor array 12, and rays from even-numbered LEDs #2, #4, #6 and #8 fall on photodiodes #1, #2, #3 and #4, respectively, of the first column.

The light sensor array 12 of the first stage and the light source array 10 of the second stage are positioned in a back-to-back relationship with each other and a two-dimensional four-by-four crossbar switch array 13 is located between them. In like manner, the light sensor array 12 of the second stage and the light source array 10 of the third stage are positioned in a back-to-back relationship with each other and a crossbar switch array 14 of identical configuration to switch array 13 is located between them. A third crossbar switch array 15 is connected to the outputs of the photodiode array 12 of the third stage.

Each switch array comprises sixteen three-dimensional four-by-four crossbar switches 30. Each crossbar switch has four input terminals disposed on a plane adjacent the light sensor array 12 of a preceding stage and connected respectively to photodiodes 24 of a corresponding set and four output terminals disposed on a plane adjacent the light source array 10 of the next stage and connected respectively to LEDs 20 of a corresponding set.

Figure 3:
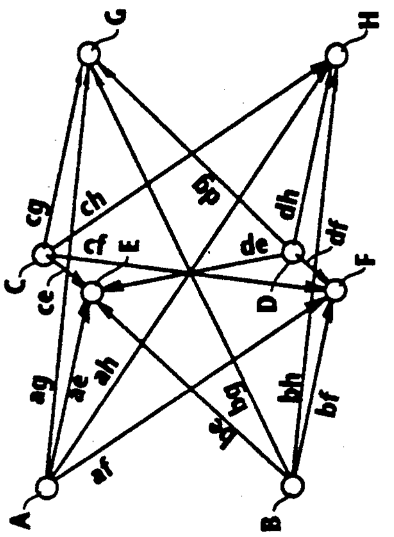
FIG. 3 shows a three-dimensional 4×4 crossbar switch.
Figure 4:
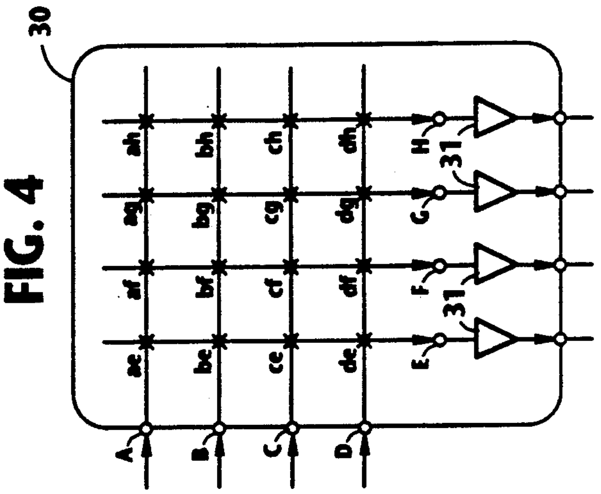
FIG. 4 shows an equivalent circuit of the three-dimensional 4×4 crossbar switch of FIG. 3.

As shown in FIG. 3, a representative 4×4 crossbar switch 30 has input terminals A, B, C and D and output terminals E, F, G and H. It is seen from the equivalent circuit of the crossbar switch shown in FIG. 4, each input terminal of the crossbar switch can be switched to any of its output terminals through sixteen crosspoints "ae" through "dh" in response to a four-bit switching control signal which is applied from a controller 16. In order to drive the LEDs, each crossbar switch includes amplifiers 31 through which the output terminals E to H are coupled to corresponding LEDs.

Returning to FIGS. 1A and 1B, the LEDs 20 of the first stages are connected to output terminals of processors 16 and the photodiodes 24 of the third stage are connected to input terminals of processors 18. It is seen that by appropriately controlling the individual switches of crossbar switch arrays 13, 14 and 15, any of the sixty-four signals from processors 16 can be switched to any of the input terminals of processors 18.

Figure 7:
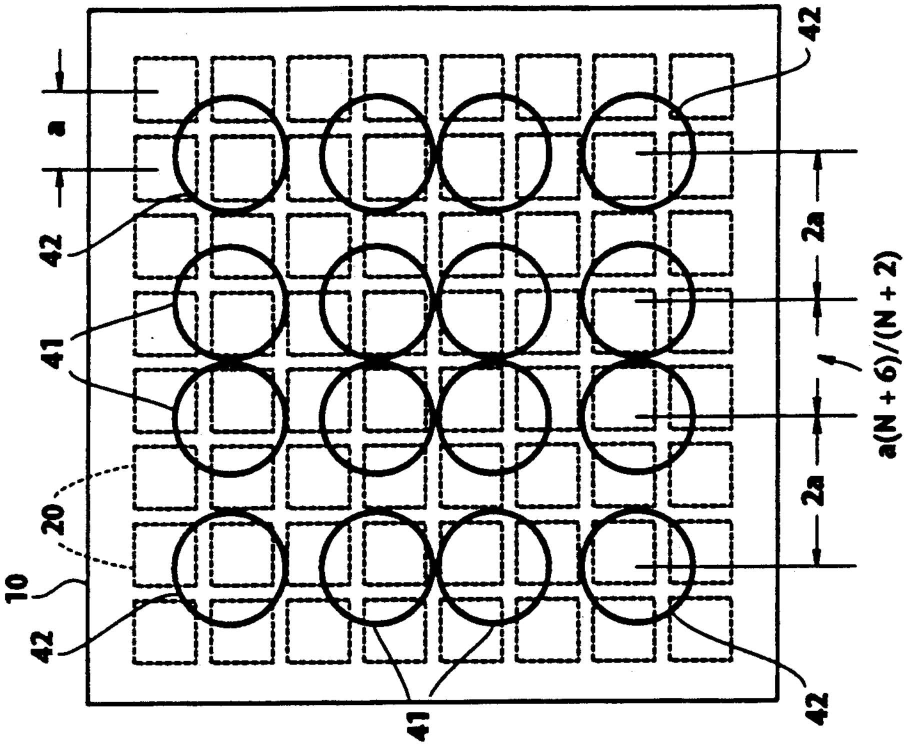
FIG. 7 shows positional relationships between the individual lenses of and the LEDs of FIG. 6.
Figure 6:
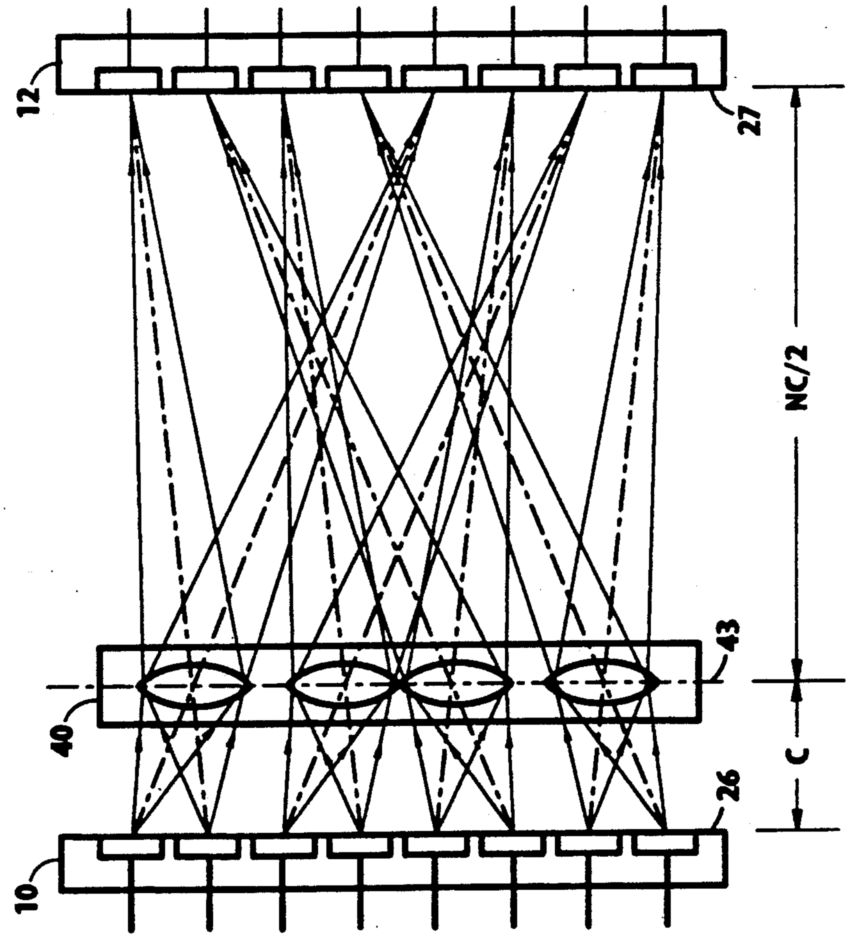
FIG. 6 shows one stage of the interconnection network using a Banyan network configuration.

FIG. 6 shows a modification of the present invention in which each stage of the interconnection network includes a lens array 40 which differs from the previous embodiment. As shown in FIG. 7, lens array 40 has lenses 41 which are arranged on two rows and two columns which intersect at the center of the array. Lenses 41 are spaced apart from each other with a pitch $a(N+6)/(N+2)$, where N is the number of LEDs 20 of each one-dimensional array, (where a is the pitch between successive LEDs 20). The other areas of the array are occupied by lenses 42 which are spaced apart from each other and from an adjacent lens 41 with a pitch 2a. In additional lenses are provided to form an 8×8 array, for example, these are arranged on the outer areas of the array and spaced apart with a pitch 2a from each other and from the inner lenses.

Lens array 40 has a common lens plane 43 which is spaced a distance C from light emitting plane 26 and a distance (focal length) NC/2 from light receiving plane 27 as shown in FIG. 6. In the illustrated embodiment, each lens 42 is spaced on centers with a distance 1.6a and the focal length is 4a as in the previous embodiment.

Figure 8:
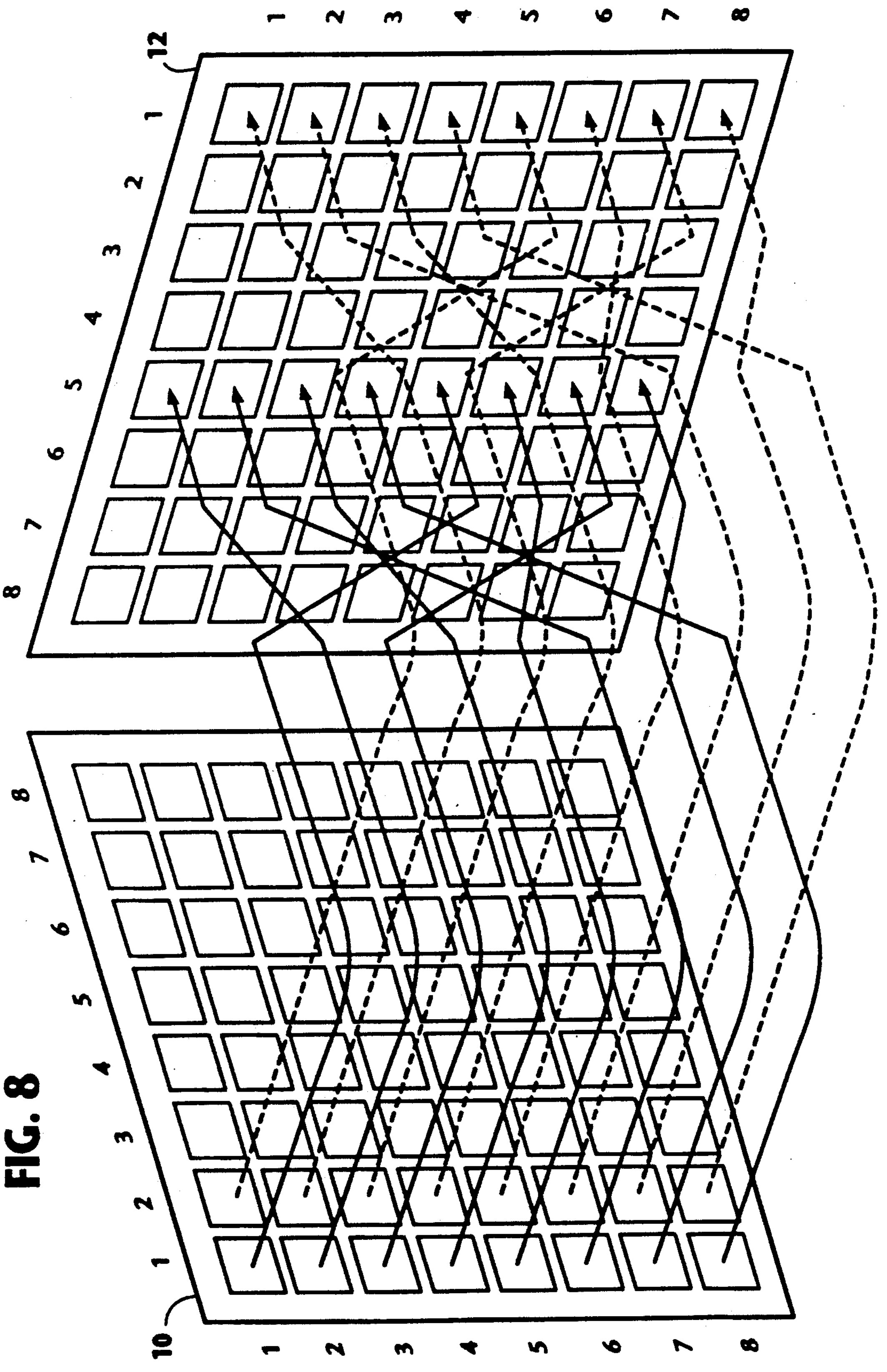
FIG. 8 shows in perspective form the paths of rays emitted from LEDs on the first and second column of the light sensor array of FIG. 6.

As shown in FIG. 8, rays emitted from LEDs #1, #5, #3, and #7 of the first column of the light source array 10 fall on photodiodes #5, #6, #7 and #8, respectively, of the fifth column of the light sensor array 12, and rays from LEDs #2, #6, #4 and #8 fall on photodiodes #1, #2, #3 and #4, respectively, of the fifth column. In like manner, rays emitted from LEDs #1, #5, #3 and #7 of the second column of the light source array 10 fall on photodiodes #5, #6, #7 and #8, respectively, of the first column of the light sensor array 12, and rays from LEDs #2, #6, #4 and #8 fall on photodiodes #1, #2, #3 and #4, respectively, of the first column. This configuration is equivalent to each stage of the Banyan self-routing network.

Figure 10:
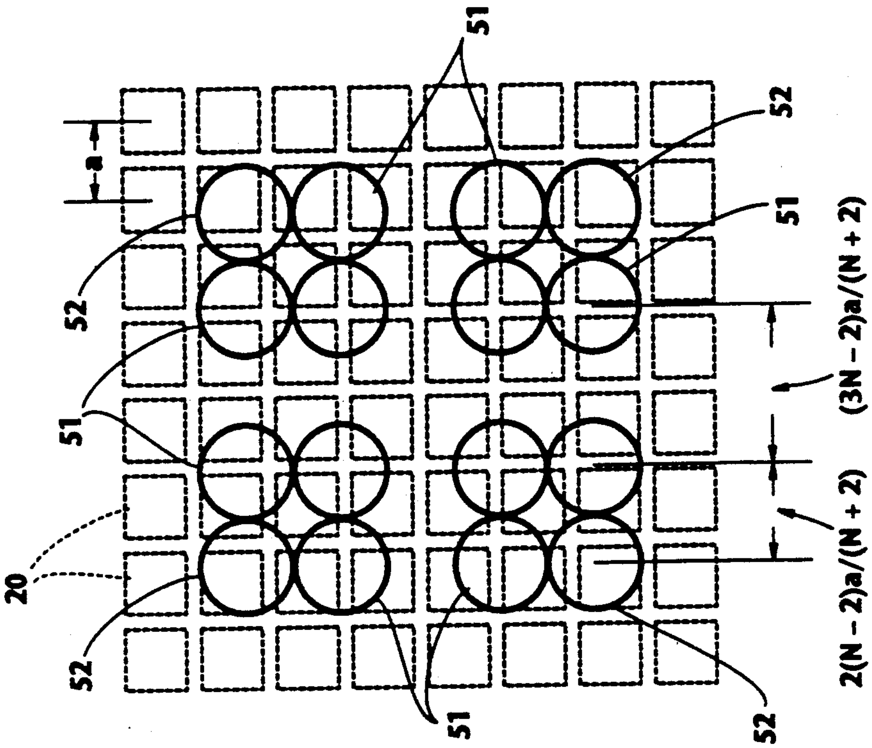
FIG. 10 shows positional relationships between the individual lenses of and the LEDs of FIG. 9.
Figure 9:
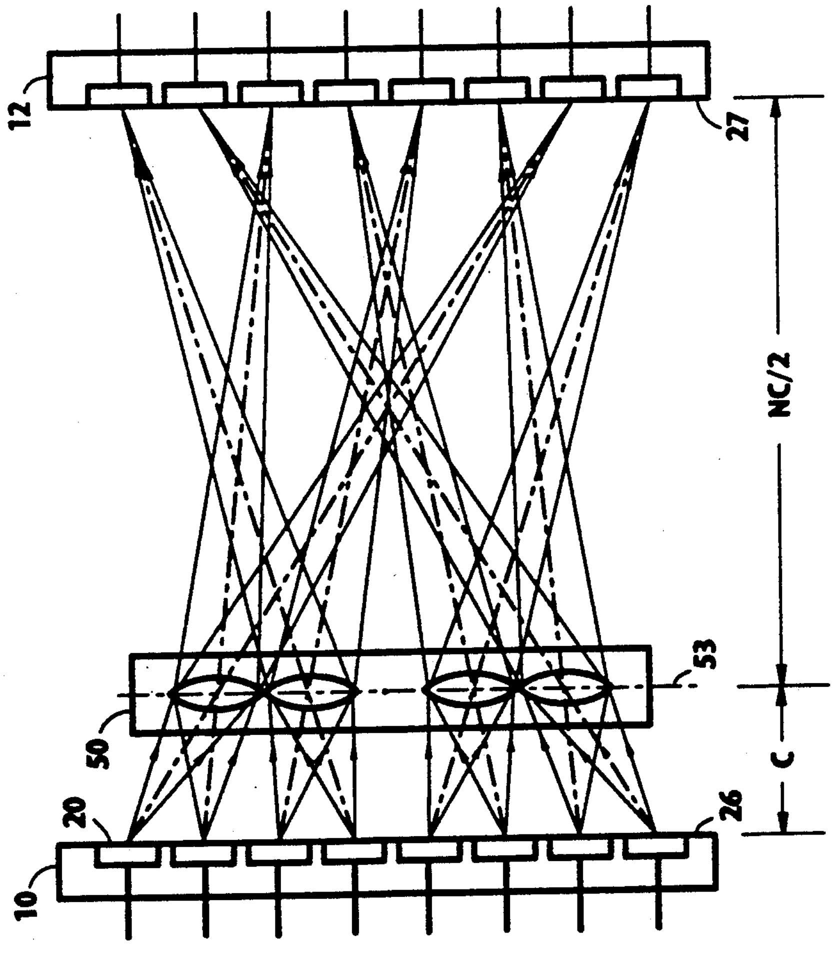
FIG. 9 shows one stage of the interconnection network using a crossover network configuration.

A further modification of the present invention is shown in FIG. 9. Each stage of the interconnection network includes a lens array 50. As shown in FIG. 10, lenses 51 are located on two rows and two columns which intersect at the center of the array and spaced apart from each other with a pitch (3N−2)a/(N+2). The other areas of the array are occupied by lenses 52 which are spaced apart from each other and from the inner lenses with a pitch 2(N−2)a/(N+2). Lens array 50 has a common lens plane 53 which is spaced a distance C from light emitting plane 26 and a distance (focal length) NC/2 from light receiving plane 27 as shown in FIG. 9. As in the previous embodiment, additional lenses can be provided to form an 8×8 array by arranging them on the outer areas of the array with a pitch 2a between them as well as from the inner lenses 51.

Figure 11:
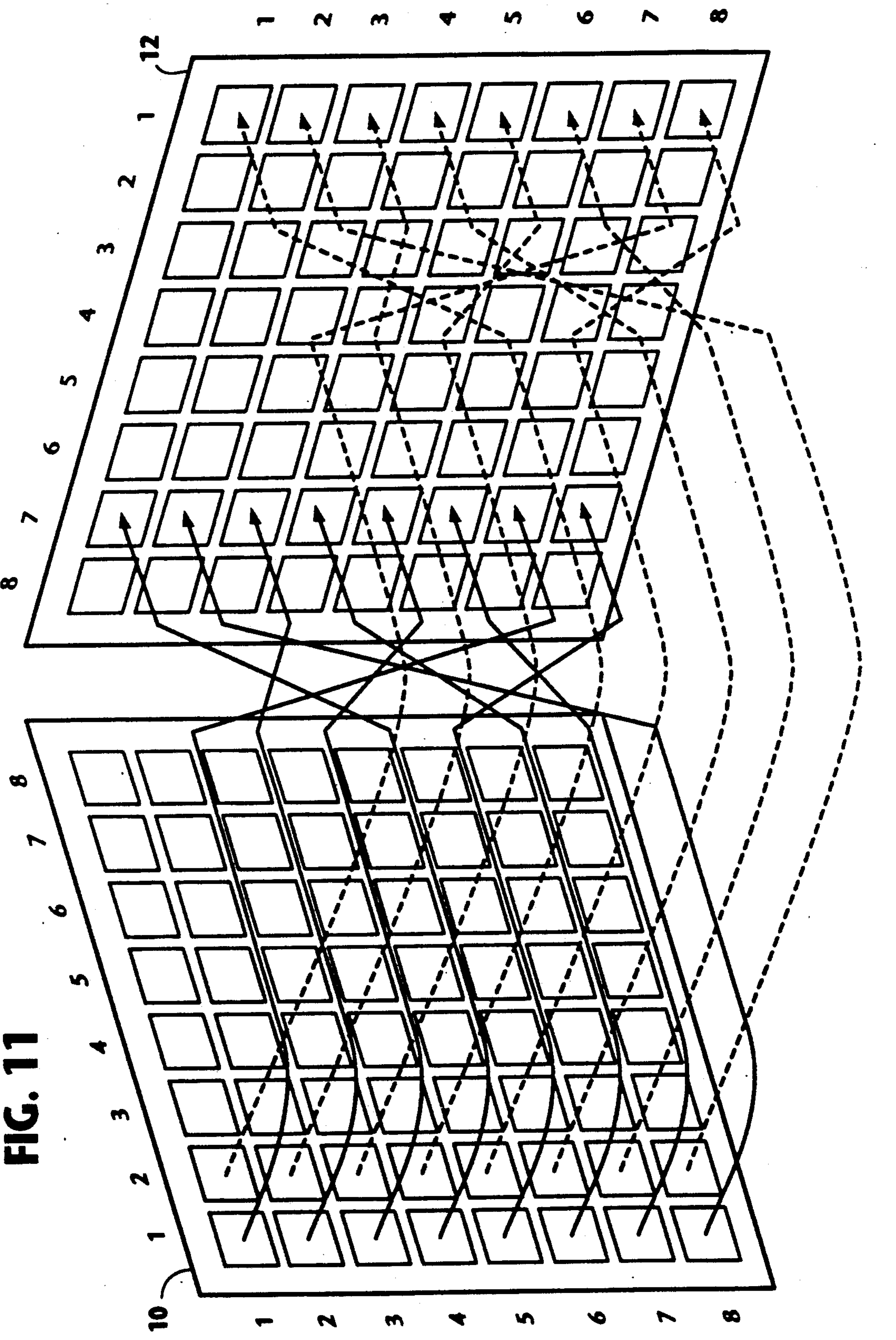
FIG. 11 shows in perspective form the paths of rays emitted from LEDs on the first and second column of the light sensor array of FIG. 9.

As shown in FIG. 11, rays emitted from LEDs #3, #7, #1 and #5 of the first column of the light source array 10 fall on photodiodes #5, #6, #7 and #8, respectively, of the seventh column of the light sensor array 12, and rays from LEDs #4, #8, #2 and #6 fall on photodiodes #1, #2, #3 and #4, respectively, of the seventh column. In like manner, rays emitted from LEDs #3, #7, #1 and #5 of the second column of the light source array 10 fall on photodiodes #5, #6, #7 and #8, respectively, of the first column of the light sensor array 12, and rays from LEDs #4, #8, #2 and #6 fall on photodiodes #1, #2, #3 and #4, respectively, of the first column. This configuration is equivalent to each stage of the crossover network.

Figure 12:
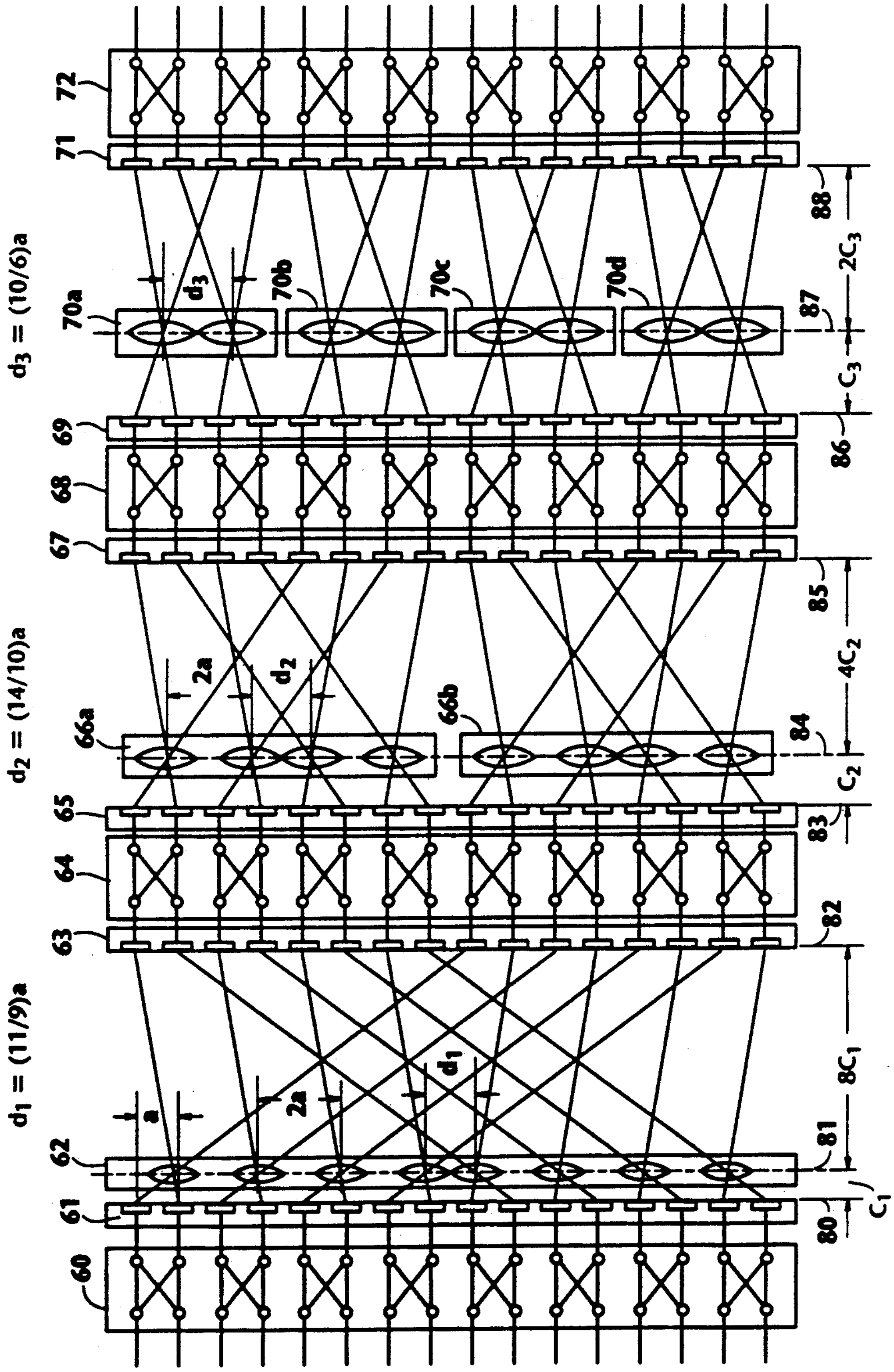
FIG. 12 shows in schematic form a three-stage photoelectronic interconnection network using Banyan configurations.

The Banyan network configuration described in connection with with FIGS. 6, 7 and 8 can be modified according to different stages to form a three-stage Banyan network as shown in FIG. 12.

This interconnection network comprises an input crossbar switch array 60 adapted to be connected to as many as 256 output terminals of processors, not shown. The outputs of crossbar switch array 60 are connected to a 16×16 light source array 61. An 8×8 lens array 62 is located between light source array 61 and a 16×16 light sensor array 63. Lens array 62 has a lens plane 81 which is spaced a distance of 8 $C_1$ from light receiving plane 82 of array 63, where $C_1$ represents the spacing between light emitting plane 80 of array 61 and lens plane 81. Arrays 61, 62 and 63 comprise the first stage of the Banyan network. Those lenses, which are positioned along the two rows and two columns intersecting at the center of the 8×8 lens array 62, are spaced with pitch $d_1$ which is equal to (11/9)a from the formula shown in FIG. 7 and other lenses are spaced at pitch 2a.

The outputs of light sensor array 63 are coupled by a crossbar switch array 64 to a 16×16 light source array 65 which constitute the second stage of the Banyan network with four 4×4 lens arrays 66*a*, 66*b* (only two being shown), and a 16×16 light sensor array 67. Each of the 4×4 lens arrays 66 is disposed in a one-to-one correspondence to each 8×8 subarray of the light source array 65 and in a one-to-one correspondence to each 8×8 subarray of light sensor array 67. Lens arrays 66 have a common lens plane 84 which is spaced a distance of 4 $C_2$ from light receiving plane 85 of array 67, where $C_2$ represents the spacing between light emitting plane 83 of array 65 and lens plane 84. In each of the lens arrays 66, those lenses located on the two inner rows and two inner columns are spaced at pitch $d_2$ which is equal to (14/10)a and other lenses are spaced at pitch 2a.

The outputs of light sensor array 67 are coupled by a crossbar switch array 68 to a 16×16 light source array 69 which constitute the third stage of the Banyan network with sixteen 2×2 lens arrays 70*a*, 70*b*, 70*c*, 70*d* (only four being shown), and a 16×16 light sensor array 71. Each of the 2×2 lens arrays 70 is disposed in a one-to-one correspondence to each 4×4 subarray of the light source array 69 and in a one-to-one correspondence to each 4×4 subarray of light sensor array 71. Lens arrays 70 have a common lens plane 87 which is spaced a distance 2 $C_3$ from light receiving plane 88 of array 71, where $C_3$ is the spacing between light emitting plane 86 of array 69 and lens plane 87. The center-to-center lens spacing of each lens array 70 is $d_3$ which is equal to (10/6)a.

The outputs of light sensor array 71 are connected through a crossbar switch array 72 to as many as 256 input terminals of processors, not shown.

It can be seen therefore that the present invention allows reduction of switching times by the combined use of 4×4 crossbar switches and stages of a photoelectronic interconnection network. Therefore, if it is desired to switch 4096 input signals to different processors, they can be switched with as few as 6 switching times, which compares favorably with 12 switching times of prior art.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A photoelectronic interconnection device comprising:

a first array of N×N light emitting elements arranged on a light emitting plane in a matrix pattern for emitting light from each of said elements in response to a signal applied thereto;

a second array of N×N light sensing elements arranged on a light receiving plane in a matrix pattern corresponding to said light emitting elements; and a lens array of p×p lenses disposed on a common optical plane located between said first and second arrays, said optical plane and said light receiving plane being spaced apart a distance which is q times greater than a distance between said light emitting plane and said optical plane, where N=pq, said lenses being spaced apart from each other with a pitch (pq+1)a/(q+1), where a is a pitch between said light emitting elements.

2. A photoelectronic interconnection device comprising:

a first array of N×N light emitting elements arranged on a light emitting plane in a matrix pattern for emitting light from each of said elements in response to a signal applied thereto;

a second array of N×N light sensing elements arranged on a light receiving plane in a matrix pattern corresponding to said light emitting elements; and a lens array of (N/2)×(N/2) lenses disposed on a common optical plane located between said first and second arrays, said optical plane and said light receiving plane being spaced apart a distance which is N/2 times greater than a distance between said light emitting plane and said optical plane, those of said lenses located along two rows and two columns which intersect at the center of said lens array being spaced apart from each other with a pitch (N+6)a/(N+2), and other lenses being spaced apart from each other with a pitch 2a, where a is a pitch between said light emitting elements.

3. A photoelectronic interconnection device comprising:

a first array of N×N light emitting elements arranged on a light emitting plane in a matrix pattern for emitting light from each of said elements in response to a signal applied thereto;

a second array of N×N light sensing elements arranged on a light receiving plane in a matrix pattern corresponding to said light emitting elements; and a lens array of (N/2)×(N/2) lenses disposed on a common optical plane located between said first and second arrays, said optical plane and said light receiving plane being spaced apart a distance which is N/2 times greater than a distance between said light emitting plane and said optical plane, those of said lenses located along two rows and two columns which intersect at the center of said lens array being spaced apart from each other with a pitch (3N−2)a/(N+2), and other lenses being spaced apart from each other with a pitch 2(N−2)a/(N+2), where a is a pitch between said light emitting elements.

4. A photoelectronic multistage interconnection network comprising:

a first stage comprising a first array of N×N light emitting elements arranged on a light emitting plane in a matrix pattern for emitting light from each of said elements in response to a signal applied thereto, a second array of N×N light sensing elements arranged on a light receiving plane in a matrix pattern corresponding to said light emitting elements, and a lens array of (N/2)×(N/2) lenses disposed on a common optical plane located between said first and second arrays, said optical plane and said light receiving plane being spaced apart a distance which is N/2 times greater than a distance between said light emitting plane and said optical plane;

a second stage comprising a first array of N×N light emitting elements arranged on a light emitting plane in a matrix pattern for emitting light from each of said elements in response to a signal applied thereto, a second array of N×N light sensing elements arranged on a light receiving plane in a matrix pattern corresponding to said light emitting elements, and four lens arrays of (N/4)×(N/4) lenses each, said lens arrays being disposed on a common optical plane located between said first and second arrays of the second stage, said optical plane and said light receiving plane being spaced apart a distance which is N/4 times greater than a distance between said light emitting plane and said optical plane;

a first switch array including (N/2)×(N/2) three-dimensional 4×4 crossbar switches connected respectively between the light sensing elements of the first stage and the light emitting elements of the second stage; and a second switch array including (N/2)×(N/2) three-dimensional 4×4 crossbar switches connected respectively to the light sensing elements of the second stage.

5. A photoelectronic multistage interconnection network as claimed in claim 4, wherein the second array of the first stage and the first array of the second stage are disposed in a back-to-back relationship to each other, and said first switch array is disposed therebetween.

6. A photoelectronic multistage interconnection network as claimed in claim 4, wherein the lenses of the first stage which are located along two rows and two columns intersecting at the center of said lens array are spaced apart from each other with a pitch (N+6)a/(N+2), and other lenses of the first stage are spaced apart from each other with a pitch 2a, where a is a pitch between said light emitting elements of each stage, and wherein the lenses of the second stage are spaced apart from each other with a pitch {(N/2)+6}a/{(N/2)+2}.

7. A photoelectronic multistage interconnection network comprising:

a plurality of stages each comprising a first array of N×N light emitting elements arranged on a light emitting plane in a matrix pattern for emitting light from each of said elements in response to a signal applied thereto, a second array of N×N light sensing elements arranged on a light receiving plane in a matrix pattern corresponding to said light emitting elements, and a lens array of p×p lenses disposed on a common optical plane located between said first and second arrays, said optical plane and said light receiving plane being spaced apart a distance which is q times greater than a distance between said light emitting plane and said optical plane, where N=pq, said lenses being spaced apart from each other with a pitch (pq+1)a/(q+1), where a is a pitch between said light emitting elements; and an interstage switch array including (N/2)×(N/2) three-dimensional 4×4 crossbar switches connected respectively between the light sensing elements of a preceding stage and the light emitting elements of a succeeding stage.

8. A photoelectronic multistage interconnection network as claimed in claim 7, wherein the second array of the preceding stage and the first array of the succeeding stage are disposed in a back-to-back relationship to each other, and said interstage switch array is disposed therebetween.

9. A photoelectronic multistage interconnection network comprising:

a plurality of stages each comprising a first array of N×N light emitting elements arranged on a light emitting plane in a matrix pattern for emitting light from each of said elements in response to a signal applied thereto, a second array of N×N light sensing elements arranged on a light receiving plane in a matrix pattern corresponding to said light emitting elements, and a lens array of (N/2)×(N/2) lenses disposed on a common optical plane located between said first and second arrays, said optical plane and said light receiving plane being spaced apart a distance which is N/2 times greater than a distance between said light emitting plane and said optical plane, those of said lenses located along two rows and two columns which intersect at the center of said lens array being spaced apart from each other with a pitch $(3N-2)a/(N+2)$, and other lenses being spaced apart from each other with a pitch $2(N-2)a/(N+2)$, where a is a pitch between said light emitting elements; and an interstage switch array including $(N/2)\times(N/2)$ three-dimensional $4\times4$ crossbar switches connected respectively between the light sensing elements of a preceding stage and the light emitting elements of a succeeding stage.

10. A photoelectronic multistage interconnection network as claimed in claim 4, wherein the second array of the preceding stage and the first array of the succeeding stage are disposed in a back-to-back relationship to each other, and said interstage switch array is disposed therebetween.

* * * * *